(12) United States Patent
Bongers-Ambrosius et al.

(10) Patent No.: US 6,575,254 B2
(45) Date of Patent: Jun. 10, 2003

(54) ELECTRICAL HAND OPERATED TOOL DRIVING DEVICE WITH AN ELECTROPNEUMATIC STRIKING MECHANISM

(75) Inventors: Hans-Werner Bongers-Ambrosius, Munich (DE); Martin Richter, Freising (DE); Konrad Artmann, Wörthsee (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/906,954

(22) Filed: Jul. 17, 2001

(65) Prior Publication Data

US 2002/0007956 A1 Jan. 24, 2002

(30) Foreign Application Priority Data

Jul. 19, 2000 (DE) .......................... 100 37 418

(51) Int. Cl.[7] .............................. B23B 45/16
(52) U.S. Cl. ............. 173/201; 173/217; 173/171; 173/197
(58) Field of Search ................ 173/201, 217, 173/171, 197

(56) References Cited

U.S. PATENT DOCUMENTS

| 1,634,780 A | * | 7/1927 | Haeseler |
| 6,220,046 B1 | * | 4/2001 | Kristen et al. ............. 62/259.2 |
| 6,321,854 B1 | * | 11/2001 | Bisutti ........................ 173/171 |

FOREIGN PATENT DOCUMENTS

| DE | 4020773 | * | 1/1992 |
| DE | 4330520 | * | 3/1994 |
| EP | 0992320 | * | 4/2000 |

* cited by examiner

*Primary Examiner*—Ted Kavanaugh
(74) *Attorney, Agent, or Firm*—Sidley Austin Brown & Wood, LLP

(57) ABSTRACT

An electrical hand operated tool driving device (1), such as a hammer drill, a combination hammer or a chipping hammer, has an electropneumatic striking mechanism (2), for which a cooling medium (8), for cooling the striking mechanism (2), flows through a liquid-tight cooling medium duct (10, 11, 12, 13), which is disposed in a housing (7) of the tool driving device (1).

8 Claims, 2 Drawing Sheets

ELECTRICAL HAND OPERATED TOOL DRIVING DEVICE WITH AN ELECTROPNEUMATIC STRIKING MECHANISM

BACKGROUND OF THE INVENTION

The invention relates to an electrical hand operated tool driving device, such as a hammer drill, a combination hammer or a chipping hammer, with an electropneumatic striking mechanism, preferably for striking operation, in the abrasive excavation of rock. Using electrical energy, by means of an electric motor and a suitable mechanical transformation, such electrical hand operated tool driving devices produce an axial, striking, oscillating and optionally, in addition, a superimposed rotational movement, which is transferred positively and not positively to a tool for appropriate use.

In the case of electropneumatic striking mechanisms, which are considered exclusively in these inventions, the mechanical energy, generally produced by an electric motor, is transferred over a cam to an oscillating driving piston and, from this, pneumatically over an air spring to a free piston, which passes on this mechanical striking energy over an anvil largely to a striking or striking and rotating tool.

Due to the repeated compression and expansion of the air column of the air spring and on the basis of thermodynamic processes, waste heat is produced, which is dissipated by conduction and convection of heat to a cooler wall of the housing of the electrical hand operated tool driving device. This wall warms up until a thermal equilibrium is reached. Depending on the power, surface temperatures of the housing wall may develop which, reaching above the permissible limiting temperatures ranging from 60° C. to 80° C., endanger the operator and his surroundings and thus limit the usable striking power of the electrical hand operated tool driving device.

Such electrical hand operated tool driving devices are known from the DE3205063A1. By means of cool air, which is produced by a fan of the electric motor and forced through the pneumatic striking mechanism and the cavities between the housing of the striking mechanism and the device housing, the striking mechanism is also cooled. According to the DE196265A1, this cooled air is passed by means of axial slots for the passage of air into an unlocking sleeve for releasing the tool from the tool holder and is used additionally for cooling the front region of the striking mechanism, the tool holder or chuck and the rear region of the tool shaft, where high temperatures occur due to the impact friction. The cooling power of the wall of the housing, which is limited by the convection of the cooling air, and the thus limited usable striking power of the electrical hand operated tool driving device are disadvantages of such solutions.

The DE4020773A1 discloses such an electrical hand operated tool driving device with an additional container for a cooling liquid and a nozzle for producing a spray mist for wetting the excavated material, for cooling the tool in the region of the abrasively acting tool cutting edges and for flushing the material removed. The cooling liquid is not used to cool the impact mechanism or the electrical hand operated tool driving device.

SUMMARY OF THE INVENTION

It is a primary object of this invention to avoid the above disadvantages and to provide a more efficient cooling of the striking mechanism in order to increase the usable impact power of the electrical hand operated tool driving device, which is limited by the permissible limiting temperatures of the walls of the device housing.

Essentially, a housing of the electrical hand operated tool driving device has cooling ducts, which surround the impact mechanism and through which a liquid cooling medium, preferably water, is passed.

Advantageously, the cooling ducts are branched once or several times from a helical distributing duct in the flow direction along the striking axis in the axial region along the air spring in order to increase the length of the cooling ducts and, with that, the usable cooling surface of the striking mechanism.

For forming the cooling ducts, the housing advantageously is constructed with a double wall. When different materials are used, adequate protection against corrosion is assured by the appropriate pairing of noncorrosive materials and by coatings and coverings in order to avoid the formation of corrosion.

Furthermore, it is advantageous to use the cooling medium to cool the driving mechanism of the electrical hand operated tool driving device and/or of the motor electronics, before it is used to cool the striking mechanism. Advantageously, the cooling medium is pumped by a pressure-producing pump through the cooling ducts and subsequently also advantageously, for flushing and cooling the tool, sprayed through a nozzle onto the working area of the tool excavating abrasive material.

The drawing contains a preferred embodiments of the invention where:

DETAILED DESCRIPTION OF THE INVENTION

Figure 1:
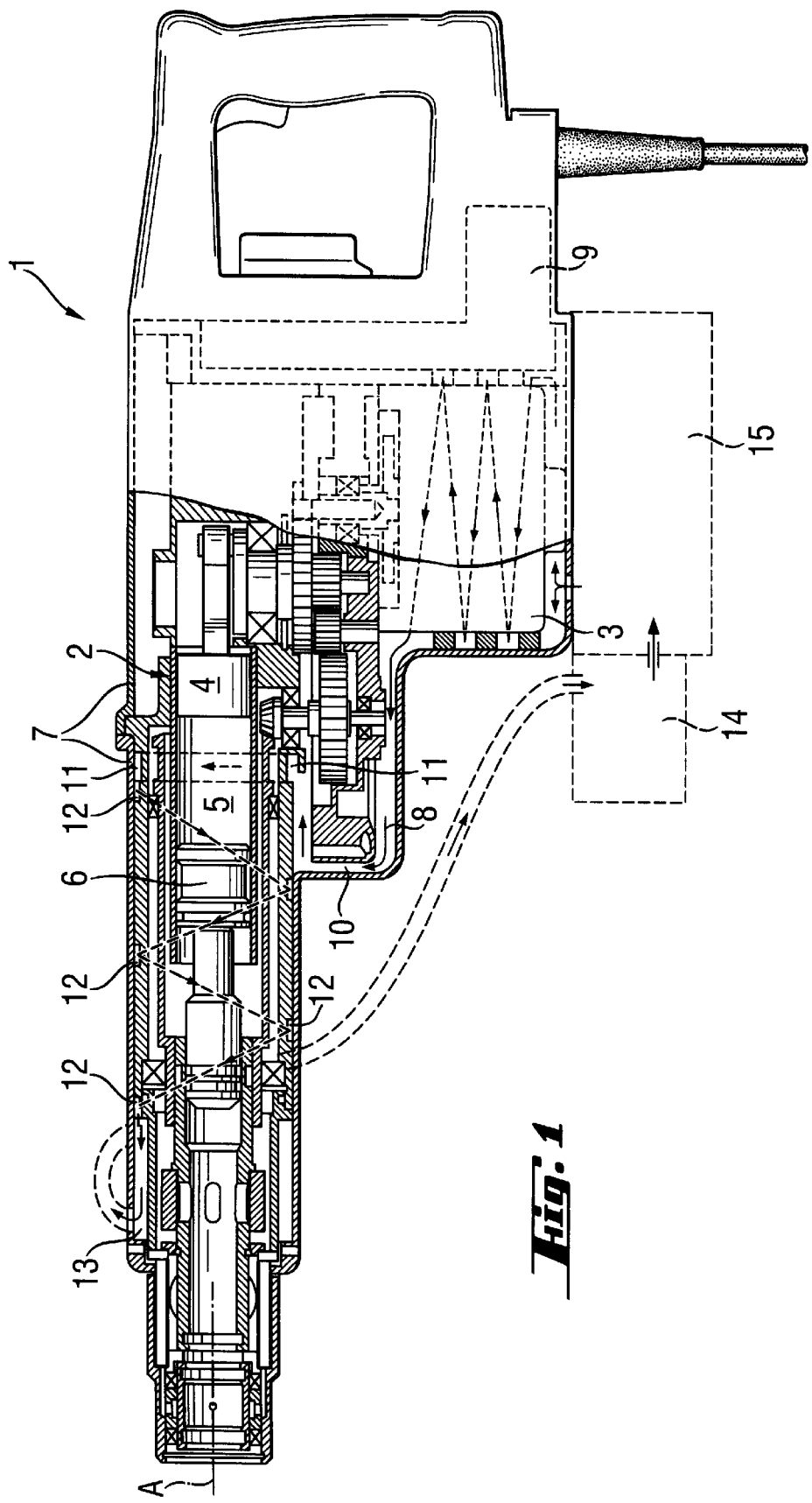
FIG. 1 is an axially extending partial sectional view of a tool driving device embodying the invention.

In FIG. 1, an electrical hand operated tool driving device 1 is shown with an electropneumatic striking mechanism 2, which consists of means for actuating a driving piston 4, driven electrically by an electrical driving mechanism 3, with an air spring 5 between the driving piston and a free piston 6. Liquid-tight cooling ducts 10, 11, 12, 13, are disposed within a preferably double-wall housing 7 of the electrical hand operated tool driving device 1 and preferably are formed by internal recesses in individual parts of the housing 7. Starting from a cooling medium inlet 10, which, in the flow direction of a cooling medium 8, is advantageously disposed after the cooling of the electrical driving mechanism 3 and of the electronics 9 for the driving mechanism 3, the depressions branch in a distributor duct 11, extending in ring-shape fashion through one or more annular ducts 12 winding at least partially helically about and radially outwardly from a striking axis A passing through the air spring 5, for cooling the striking mechanism 2, and subsequently end in an outlet 13 for further use of the cooling medium 8 or, as indicated by the broken line, is returned through a loop to the inlet 10.

Figure 2:
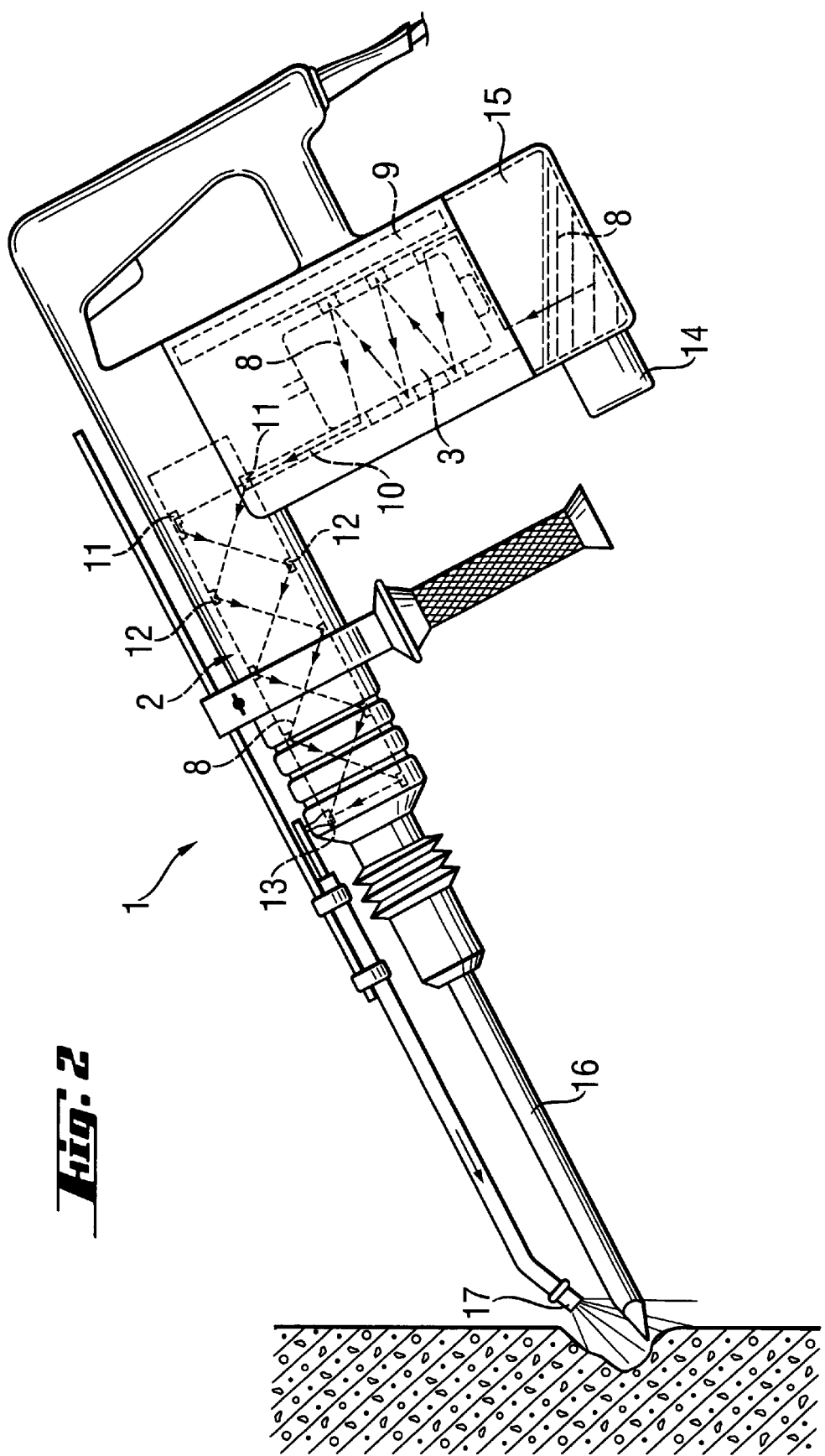
FIG. 2 is a side elevation view of another embodiment of the invention illustrating the flow of the cooling medium.

In FIG. 2, the electrical hand operated tool driving device 1 has an additional cooling medium container 15 mounted on the housing 7, which advantageously is disposed in the lower region of a predominantly horizontally used tool driving device 1 and is provided with a pump 14 for producing a flow of cooling medium 8. Further, a tubular nozzle 17 is mounted on the housing 7 and is directed toward the free end of a tool 16 secured in the tool driving device 1, for flushing and cooling the cutting edges of the tool 16.

What is claimed as new and desired to be protected by letters patent is set forth in the appended claims.

What is claimed is:

1. An electrical hand operated tool driving device comprising a housing (7) having a tool driving axis (A) and a front end for receiving a tool and a rear end, an electropneumatic striking mechanism (2) within said housing (7) and including a driving piston (4) moving along said tool driving axis (A), a free piston (6) spaced ahead of said driving piston along said tool driving axis (A) and an air spring (5) located between said driving piston (4) and said free piston (6) along said tool driving axis (A), a liquid-tight cooling duct (10, 11, 12, 13) within said housing extending around said striking mechanism (2) for flowing a cooling medium (8) for cooling said striking mechanism.

2. An electrical hand operated tool driving device, as set forth in claim 1, wherein said cooling duct comprises a cooling medium inlet (10) at one end of said cooling duct, an outlet (12) at the other end of said cooling duct, a distributor duct (11) between said inlet and outlet, said distributor duct (11) runs in an annular path about said tool driving axis (A) in the axially extending region of said air spring (5), said distributor duct comprises at least one duct extending in part about said air spring and ending in said outlet (12).

3. An electrical hand operated tool driving device, as set forth in claim 1, wherein said at least one duct of said distributor ducts extends helically about said tool driving axis (A).

4. An electrical hand operated tool driving device, as set forth in claim 1, wherein said housing is formed as a double wall with said cooling duct formed at least in part by recesses within at least one of said double walls.

5. An electrical hand operated tool driving device, as set forth in claim 1, wherein said striking mechanism (2) includes an electrical driving mechanism (3) and electronics (9) for said driving mechanism, and said cooling duct extends around at least one of said driving mechanism (3) and said electronics (9).

6. An electrical hand operated tool driving device, as set forth in claim 1, wherein a cooling medium container (15) is connected to said housing (7) for supplying cooling medium to said cooling duct.

7. An electrical hand operated tool during driving device, as set forth in claim 6, wherein a pressure producing pump (14) is connected to said cooling medium container (15) for pumping said cooling medium (8).

8. An electrical hand operated tool driving device, as set forth in claim 7, wherein a line connected on the exterior of said housing (7), a nozzle on an outlet end of said line and directed toward a cutting end of said tool (16), and said line connected to said outlet of said cooling dust for supplying the cooling medium to said nozzle for directing a spray of the cooling medium onto the cutting end of said tool.

* * * * *